United States Patent [19]

Firebaugh

[11] Patent Number: 4,827,155

[45] Date of Patent: May 2, 1989

[54] SOLID STATE ELECTRONIC IRRIGATION CONTROLLER

[75] Inventor: Dale C. Firebaugh, Carson City, Nev.

[73] Assignee: Richdel Div. of GardenAmerica Corporation, Carson City, Nev.

[21] Appl. No.: 934,343

[22] Filed: Nov. 24, 1986

[51] Int. Cl.[4] ............................................. G06F 15/56
[52] U.S. Cl. ................................ 307/141.4; 137/624.2
[58] Field of Search .......... 137/624.2, 624.11, 624.12, 137/624.18, 624.19, 624.13, 624.16, 624.21; 307/38, 141.4, 141.8, 41

[56] References Cited

U.S. PATENT DOCUMENTS

| | | | |
|---|---|---|---|
| 4,165,532 | 8/1979 | Kendall et al. | 137/624.2 |
| 4,189,776 | 2/1979 | Kendall | 137/624.2 |
| 4,209,131 | 6/1980 | Barash et al. | 137/624.2 |
| 4,304,989 | 12/1981 | Vos et al. | 137/624.2 |
| 4,423,484 | 12/1983 | Hamilton | 137/624.2 |
| 4,569,020 | 2/1986 | Snoddy et al. | 137/624.2 |

Primary Examiner—Bernard Roskoski
Attorney, Agent, or Firm—Keith D. Beecher

[57] ABSTRACT

A solid state electronic controller for electrically-operated water sprinkler valves in an irrigation system. The controller is constructed to control a number of different water sprinkler valves in each of a number of different watering zones, for successive time intervals at one or more preset time periods during each day of the week. The controller includes a liquid crystal display which exhibits instruction words and numbers to facilitate the programming of the controller, for monitoring the operation of the controller, and also for exhibiting malfunctions in the system.

10 Claims, 4 Drawing Sheets

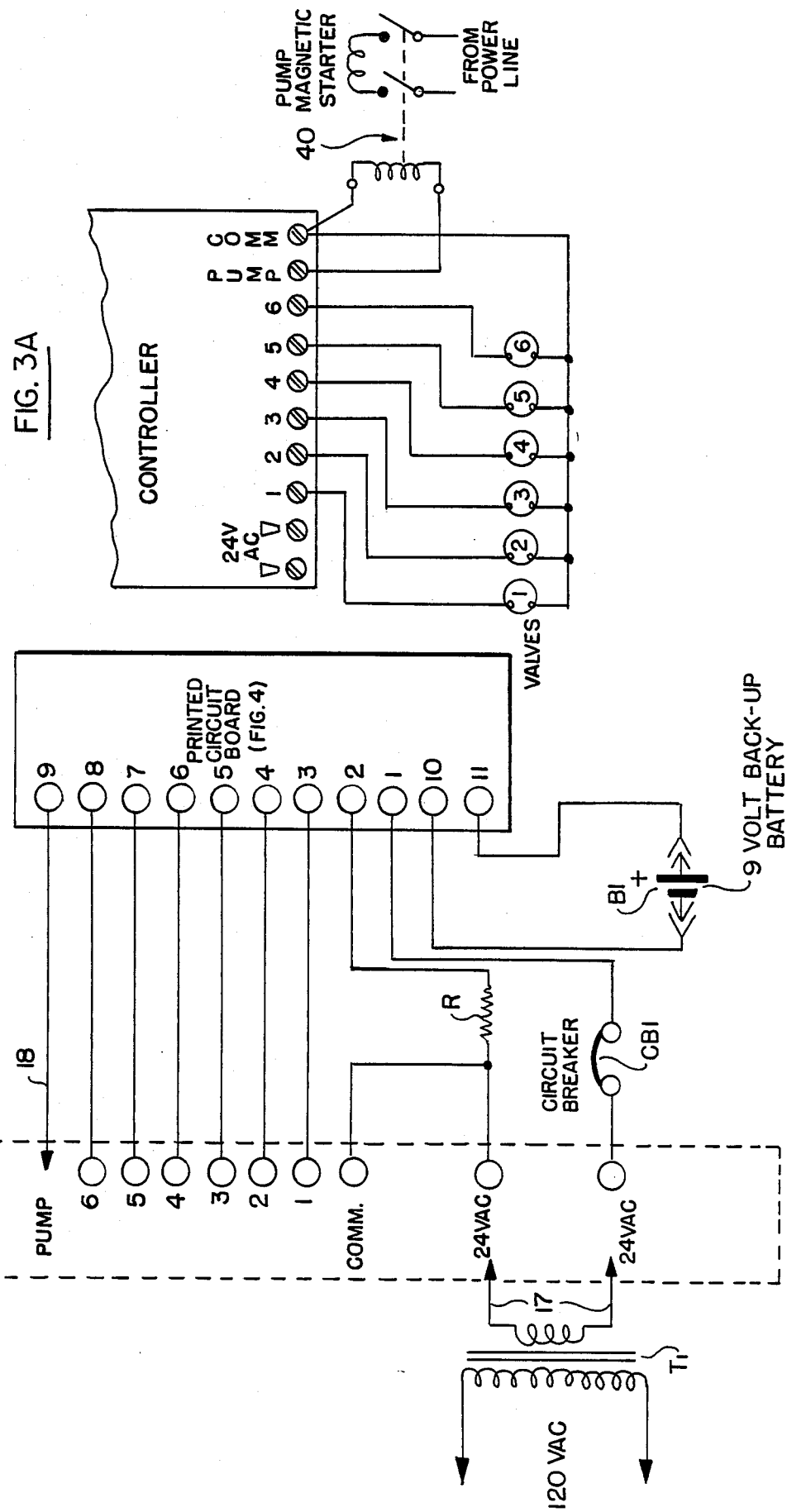

FIG. 6
L.C.D. DISPLAY SAMPLES (A) 18:88 — DAY 12345, START NO., ZONE NO., MANUAL ALL ZONES, SUN MON TUE WED THU FRI SAT, RAIN START PAUSE RUN, AM PM ERROR, TIME OF DAY (B) 12:59 — RAIN, SUN MON TUE WED THU FRI SAT, AM PM ERROR, TIME OF DAY (C) 4 — START NO., START, 12:59 TIME, AM PM ERROR (D) 15 — DAY 12345, ZONE NO., MANUAL ALL ZONES, SUN MON TUE WED THU FRI SAT, PAUSE RUN, 12:59 TIME, ERROR (E) 5 — ZONE NO., SUN TUE THU SAT, RUN TIME, FUS, ERROR

FIG. 5

(A) SUN 4:00 PM — TIME OF DAY (B) START NO. 1 START TIME 2:00 AM (C) ZONE NO. 1 RUN TIME :05, SUN MON TUE WED THU FRI SAT (D) DAY 123456 ZONE NO. 1 RUN TIME :30, SUN MON TUE WED THU FRI SAT 4,827,155

SOLID STATE ELECTRONIC IRRIGATION CONTROLLER

BACKGROUND OF THE INVENTION

U.S. Pat. No. 4,097,763, which is assigned to the present assignee, describes and claims an electric controller which is intended to accomplish the same general purpose as the solid state controller of the present invention. The controller of the present invention, however, constitutes a distinct improvement over the controller described in the patent, in that the mechanical elements of the prior controller have been replaced by solid state electronic components, and additional control functions have been incorporated therein. The controller of the invention is also advantageous in that it is relatively simple to program and operate, and it is capable of extended trouble-free operation.

The controller of the invention is capable of turning a plurality of sprinkler valves on and off automatically in sequence; and it permits the user to water each of a number of watering zones on a separate schedule, using any combination of weekdays and time intervals during each day. The controller is also capable of automatically turning a water pump or master valve on and off. A self-prompting liquid crystal display makes it easy to set up any desired watering schedule, and to review the established watering schedules from time-to-time. The display serves to guide the user through each step required to program the unit by appropriate words and numbers.

The controller to be described is constructed to permit the user to water, for example, up to four times a day, if so desired, which is ideal for new lawns. It also permits the user to water up to thirteen hours a day which is ideal for drip irrigation. A pause control makes it easy to interrupt the watering cycles for yard activities. Also, a manual operating mode permits the user to water manually when an automatic watering cycle is not in progress.

The controller to be described also includes an electronic circuit which removes a malfunctioning valve from the system, but which enables the system to continue normal control of the other valves, thereby preventing shut-down of the system. The circuit also incorporates a diagnostic feature which causes the malfunctioning valve number to appear on the liquid crystal display for easy repair.

The controller of the invention is of the same general type as the solid state controller described in Kendall et al U.S. Pat. No. 4,165,532. However, the controller of the invention incorporates certain features and improvements do not appear in the Kendall apparatus.

BRIEF DESCRIPTION OF THE DRAWINGS

FIG. 3 is a circuit diagram showing the connections from a terminal board, and from other components within the housing of the controller to a printed circuit board which is also mounted in the housing, the printed circuit board serving to support the solid state electronic elements of the controller;

FIG. 3A shows the connections from the terminal board within the housing of the controller to a number of controlled water sprinkler valves and a water pump;

FIGS. 5 and 6 represent examples of different data displayed by a liquid crystal display which is incorporated into the controller.

DETAILED DESCRIPTION OF THE ILLUSTRATED EMBODIMENT

Figure 1:
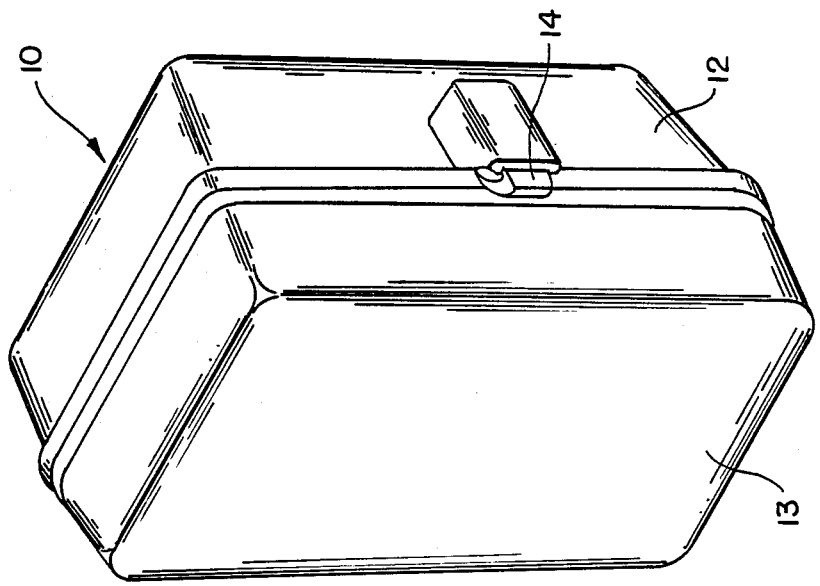
FIG. 1 is a perspective view of one of the embodiments of the solid state electronic irrigation controller of the invention enclosed in an appropriate housing with the cover in place.

The controller of the invention is designated 10 in FIG. 1, and it includes a housing 12, and a cover 13 hinged to the housing. The cover is held in a closed condition with respect to the housing by an appropriate latch 14.

Figure 2:
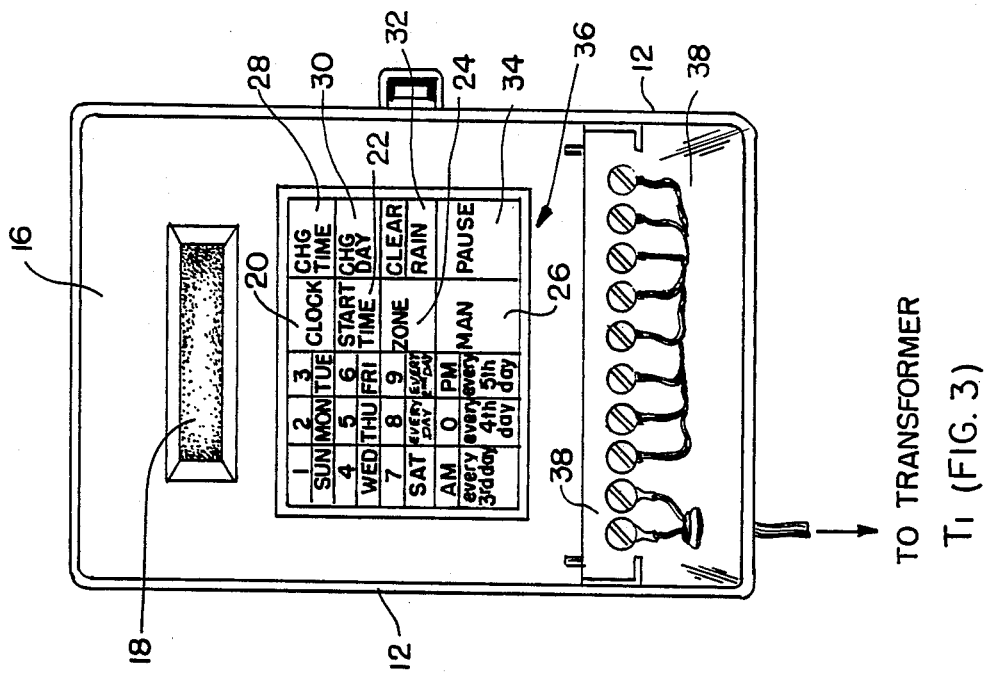
FIG. 2 is a front elevational view of the controller of FIG. 1 with the cover removed to reveal a keyboard, and other components associated with the controller.

As shown in FIG. 2, a mounting plate 16 is supported within housing 12, and a liquid crystal display 18 is mounted on the mounting plate. The liquid crystal display exhibits the time of day, day of week, zone being watered, watering run time, and it also indicates programming errors and short circuits.

A keyboard 36, including a number of manually operated keys, is also mounted on the mounting plate 16. The keyboard 36 includes a CLOCK key 20 which permits the user to set the time of day; a START TIME key 22 which permits the user to set up to four watering times per day; a ZONE key 24 which calls up eight different zones on the display 18 to allow for programming and reviewing schedules in each zone. The keyboard also includes a key 26 designated MAN which enables all of the zones, or a selected zone, to be watered manually. A key 28 designated CHG TIME is also included in the keyboard to permit the user to change all times, including the clock times, start times and run times for each zone; and a key 30 designated CHG DAY which permits the user to change the days on which each zone is to be watered.

A key 32 designated CLEAR/RAIN terminates the automatic watering in progress or permits the user to prevent automatic watering from starting. A key 34 designated PAUSE temporarily interrupts a watering cycle in process. The key board 36 also contains sixteen day/number keys which permit the user to set the watering days, the clock time, and the watering run times.

A terminal board 38 is mounted in housing 12 (FIG. 2), and it provides terminal screws for receiving electric leads which connect the controller to a transformer T1 (FIG. 3); to the various valves 1–6 (FIG. 3A); and to a pump relay 40 (FIG. 3A). Transformer T1 is a step-down transformer, and it permits the controller to be plugged into a 120 volt AC source, with the transformer providing desired 24 volt AC operating voltage for the controller. The controller is also connected to a 9 volt battery B1 for emergency program backup, as shown in FIG. 3. Relay 40, when energized, connects the magnetic starter of a water pump to the power line to start up the pump. Alternately, relay 40 may be replaced by an electrically operated main water valve, where a pressurized water source is available.

As also shown in FIG. 3, the secondary of transformer T1 is connected to terminal strip 38 by leads 17. Transformer T1 may be a class 2, current-limiting type which varies its secondary output as a function of secondary load. As the secondary load increases, the secondary voltage decreases limiting the current through the secondary winding and load. A short circuit across the secondary output instantaneously reduces the secondary voltage to approximately zero, limiting the secondary current to less than 5 amperes.

The controller may be programmed in the following manner:

As an initial step, the controller's clock, which features a 12-hour format, is set to the correct current day and time. When the power is first turned on, the clock is stopped, and the display 18 automatically displays SUNDAY and a time of 4:00 P.M., as shown in FIG. 5A. To set the controller to the current time and day, the user proceeds as follows A. The CHG TIME key 28 (FIG. 2) is pressed, causing the time digits on the display to flash;

B. The appropriate number keys of keyboard 36 are pressed to set the correct current time, and the A.M. or P.M. keys are pressed for morning or afternoon;

C. The CHG DAY key 30 is then pressed, causing the days of the week to appear on the display 18 with SUN flashing;

D. The appropriate day key of keyboard 36 is pressed to the current day, causing that day to begin flashing on the display;

E. The CLOCK key 20 is then pressed, causing the current day to be entered into memory. The clock timing is reset by pressing any function key after a time change. After any change the pressing of any function key will enter that data.

The next step is to set the controller to the times of day at which watering is to occur. The controller can be programmed, for example, to water up to four times a day. To program the start times, the user proceeds as follows:

A. The START TIME key 22 is operated, causing the display 18 to exhibit START NO. 1, with a time of 2:00 A.M., as shown in FIG. 5B;

B. The CHG TIME key 28 is pressed, causing the time digits of the display to flash;

C. The appropriate number keys of keyboard 36 are operated to set the hours and minutes for the first start time, and then the A.M. or P.M. key is pressed for morning or afternoon;

D. The START TIME key 22 is pressed again, causing the first start time to be entered in the controller, and START NO. 2 is then exhibited on display 18;

E. Steps B, C and D are then repeated to set the remaining three start times for each day.

If all four start times are not required, any of the start times may be programmed to "OFF" by pressing START TIME key 22, CHG TIME key 28, CLEAR/RAIN key 32, and then CLOCK key 20.

The next step is to set the watering schedule for each zone. Each zone may be programmed for a run time ranging from "OFF" to 12 hours, 59 minutes. The zones may also be programmed to be watered on specific days of the week, and for specific time intervals during each day.

To program the watering schedule for each zone by day of the week, the following steps are taken:

A. The ZONE key 24 (FIG. 2) is pressed, causing "ZONE 1" to be exhibited on the display 18 with a run time of :05, as shown in FIG. 5C;

B. The CHG TIME key 28 is then pressed, causing the run time to flash;

C. The appropriate number keys of keyboard 36 are then pressed to set the desired length of watering time up to, for example, a maximum of 12 hours, 59 minutes;

D. The CHG DAY key 30 is pressed, causing all of the zone's day options to appear across the top of the display, as shown in FIG. 5C, with SUN through SAT flashing;

E. The desired watering day is entered by pressing one or more of the days-of-the-week keys of keyboard 36;

F. The ZONE key 24 is then pressed, and the schedule for ZONE 1 is then entered into the controller's memory, and ZONE 2 is then displayed;

G. Steps B through F are then repeated for each zone.

As each zone is watered, a "RUN TIME" message will flash on display 18, and the watering run time will count down minute-by-minute until it reaches zero. At that point, the display will be switched to the next zone to be watered, and its watering run time will be counted down, the operation being repeated for each zone. This provides an easy way for the user to find out how much watering time remains for any particular zone.

If while programming a change a wrong numerical key is pressed the pressing of the CLEAR/RAIN key will cause the display to revert back to the original figures, before the change was started, and ready for entry of correct data. If an "ERROR" message appears, after pressing a function key, the pressing of the CLEAR/RAIN key will return the display back to its original figures and a correct entry can be made.

Any start time or zone data can be reviewed at any time. Repeatedly pressing the START TIME key or the ZONE key will cause the display to cycle through each function. If no key is pressed for 30 seconds, the display will return to the controller's present operational mode. The user may also return to the clock mode by pressing the CLOCK key. The CLEAR/RAIN key returns the controller to its present operating mode, clock or zone watering.

The ERROR message will flash on the display if a time greater than 59 minutes or 12 hours is entered by pressing a function key after the entry. The ERROR message will flash for 30 seconds and, if no other key has been pressed, the display will revert to the operating mode that the controller is in. The data contained in the controller, before the change producing the error occurred, will be retained.

If a short circuit is detected in any of the watering valves, the micro-controller Z1 will stop watering the zone, thereby disconnecting the short circuited zone from the controller. The controller will move to the next zone to be watered and will continue the watering cycle. The display will remain on the zone number that had the short circuit and display "FUS", instead of the run time, plus the ERROR message will also appear with the two alternately flashing. This enables the user to determine which zone is in the short circuited condition. During the short circuited condition of any particular zone, all other zones will continue to be watered.

While watering, manually or automatically, the watering cycle may be temporarily stopped to make changes or repairs. The PAUSE key will stop the watering while placing a flashing PAUSE message on the display along with the flashing RUN TIME message. The controller, and the display, will freeze the zones run time countdown until the user again presses the PAUSE key to continue the zones watering and remove the PAUSE message from the display. If, for some reason, the control is left in the pause mode, the freeze and watering will remain until midnight at which time the controller will remove the pause freeze and cancel any pending watering cycles. The controller will then be ready for the new days watering cycles.

With the display in the clock mode the pressing of the RAIN/CLEAR key will inhibit all start times from starting automatic watering, and will cause a flashing RAIN message to appear on the display. Manual watering is still operational during the rain shut-down.

A manual watering of all zones, other than those set to OFF, may be started by pressing the MAN key twice. The first pressing of the MAN key will cause a "MANUAL ALL ZONES" message to flash on the display, and a second pressing of the MAN key will start the watering cycle and cause the "RUN TIME" message to flash on the display.

If a start time produces a watering cycle which runs into the next start time, the controller will move the conflicting time ahead to allow the completion of the present watering cycle. At the end of the present watering cycle the delayed start time will start watering. All of the four start times are capable of being displaced allowing for the completion of all watering cycles, unless a start time produces a watering cycle which runs over midnight. That start time will run to its completion but any other pending start times will be cancelled. If the watering cycle, running over midnight, interferes with the first start time of the new day, the new start time will be delayed to allow the completion of the watering over midnight.

Each zone, accordingly, is programmed with a run time of from OFF to 12 hours, 59 minutes, in increments of minutes and hours, plus its own watering sequence consisting of days of the week, or every day, every second day, every third day, every fourth day or every fifth day.

Figure 4:
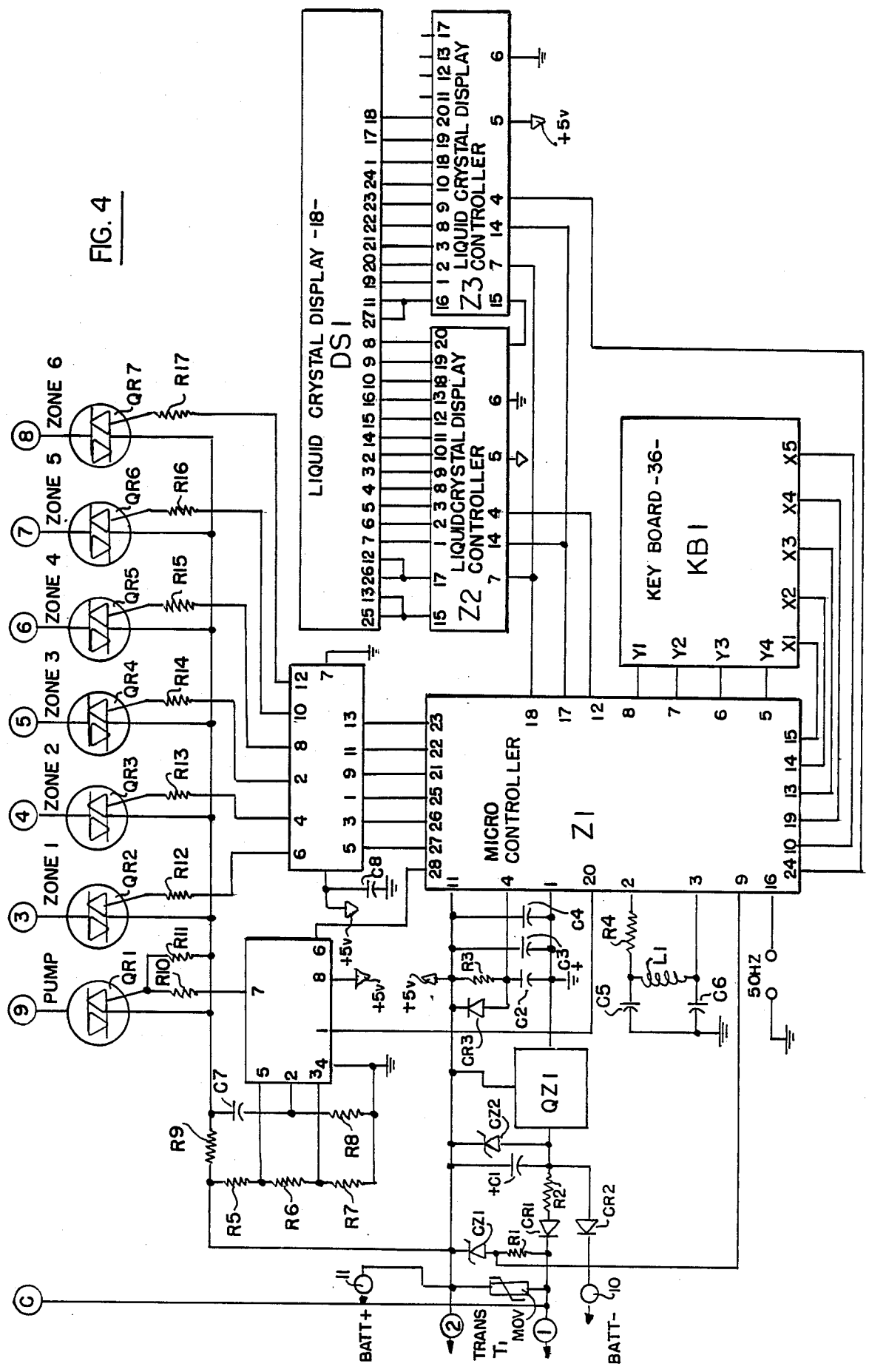
FIG. 4 is a schematic circuit diagram for the various solid state electronic elements which are mounted on the circuit board of the controller.

The system in FIG. 4 includes a micro-controller Z1 which may be a National Semiconductor COP444L Series adapted to the system of the invention. The pins 23, 22, 21, 25, 26 and 27 of the micro-controller are connected to a CMOS HEX inverter 74HC04. The inverter is connected to the gates of a plurality of triacs designated QR2, QR3, QR4, QR5, QR6 and QR7. The triacs may be 5 mA gate triacs of the type marketed by Motorola as 2N6071A, or by Teccor as Q2004F31. The inverter Z4 acts as a driver for the triacs. The system is constructed to have a direct current voltage polarity such that signals must be inverted to trigger the triacs. This is to assure that all of the triacs will be in an "off" state during the first power-up of the system.

Pin 28 is connected to an integrated circuit Z5 which may be of the type designated LM393. The portion of the integrated circuit Z5 between pins 6 and 7 functions as a CMOS HEX inverter, similar to the inverter Z4, and that section of the printed circuit Z5 is used to trigger a triac QR1. Triac QR1 is used, for example, to activate the pump relay 40 (FIG. 3A), and the triacs QR2–QR7 are used to activate the various water valves shown in FIG. 3A.

The other section of the integrated circuit Z5 functions as a voltage dual comparator. The 24 volt alternating current input (FIG. 3) is applied across terminals 1 and 2 in FIG. 4, and is rectified by a diode CR1 and filtered by filter capacitor C1. The resulting direct current voltage is regulated to a +5 volt value by a voltage regulator QZ1 of any known type. Zener diode C22 (CR22) acts as a protection for the system for excess AC voltage peaks. The diode CR3, resistor R3 and capacitor C2 cause a voltage pulse to be introduced to pin 4 of the micro-controller which assures that all of the components of the system are reset during the first power-up of the system. Capacitors C3 and C4 also serve as filter capacitors.

The back-up battery B1 (FIG. 3) is connected across terminals 10 and 11 in FIG. 4. Diode CR2 protects against the battery being connected with the wrong polarity for the system. The element designated MOV is a metal oxide varistor which protects against high voltage spikes due, for example, to lightning strikes. A Zener diode CZ1 and resistor R1 is connected across the terminals 1 and 2, and the junction of those elements is connected to pin 9 of the micro-controller.

The back-up battery B1 may be a 9 volt battery, Mallory MN1604 or Ever-Ready 522. This battery will maintain the programmed data and a reasonably accurate time of day for a continuous period of 36 hours, or for an extended period if only brief power outages are experienced. While on battery the control will be operational except for power to operate the zones. The user may review and make changes, and cause the apparatus to function in every way except watering. If, while on battery, a start time is reached the display will change to the first zone to be watered and remain in a suspended condition at that point, without counting down. If the power outage occurs during a watering cycle the display will stop at the countdown of the zone watering. When power returns, the watering will start from where it left off. In either case watering will not be lost due to a power outage, just delayed. All pending watering cycle start times that have accumulated will occur unless the time runs over midnight. The start time running at that time will continue to its completion with any other pending start times being cancelled.

So long as the system is operating on the 60 Hz power from the alternating current source through transformer T1 of FIG. 3, a 60 Hz signal is applied to pin 9 of the microcontroller Z1 for synchronizing the clock to the alternating current line. When alternating current power is lost, and the system is operating on the back-up battery B1, the signal to pin 9 is lost, and the micro-controller responds by shutting down current watering. However, the system automatically remembers its condition at the time power was lost, so that it can resume when power is regained, except under the conditions discussed above. During the battery back-up mode, the system is capable of all its operations regarding programming and monitoring, with the exception that actual watering does not occur.

A resistance/capacitance network R5, R6, R7, R8, R9 and C7 is connected to the dual comparator side of the integrated circuit Z5. If any one of the watering valves, or the pump relay, selected by the micro-controller Z1 should be in a short circuit condition, the sudden drop of voltage across the capacitor C7 indicates that fact, and Z5 introduces a signal from its pin 1 to pin 20 of the micro-controller. The micro-controller then stores in its memory the fact that the particular element is short circuited, and skips that element during the next cycle of controls, unless the short circuit is corrected. Also, the micro-controller causes the display 18 of FIG. 2 to display the fact that a short circuit condition is present in the particular element. During normal operation, the resistors R5, R6 and R7 set reference voltages in the integrated circuit Z5 so that no indication is sent to the micro-controller Z1 unless a sudden drop of voltage occurs across C7.

The inductance coil L1, resistor R4 and capacitors C5 and C6 connected to the pins 2 and 3 of the micro-controller Z1 establishes a resonant circuit which, under normal operation of the system, resonates at 500 KHz. The resulting high frequency is divided in the micro-controller to 60 Hz to provide a simulated 60 Hz source for the clock when the system is operating on battery back-up.

A jumper may be placed across the terminals connected to pin 16 of the micro-controller to set the system for operation under 50 rather than 60 Hz alternating current input power.

The keyboard 36, designated KBI in FIG. 4, is connected to the micro-controller Z1 in conventional manner. The outputs X1–X5 of keyboard 36, designated KB1 in FIG. 4, are connected to pins 15, 14, 13, 19 and 10 of the microcontroller, and the keyboard outputs Y1–Y4 are connected to pins 8, 7, 6 and 5 of the micro-controller.

The micro-controller Z1 drives the liquid crystal display 18, designated DSI in FIG. 4, by connections to its pins 12, 17 and 18. Liquid crystal controllers Z2 and Z3 are used in the circuit, and these may be of the type manufactured and sold by National Semiconductor under the designation COP472N-3.

The important features of the controller of the present invention include the use of the liquid crystal display 18 which permits all instructions and monitoring information to be displayed, as described above. Another feature of the system is the fact that when the back-up battery is used, the system is still capable of performing all its normal operations, except for actually causing watering to occur. Another feature is the fact that all programming and other operations of the system can take place even while the system is in an actual watering condition.

It will be appreciated that while a particular embodiment of the invention has been shown and described, modifications may be made, and it is intended in the claims to cover all modifications which come within the true spirit and scope of the invention.

I claim:

1. A solid state electronic control system including: a plurality of electrically controlled valves; a micro-controller including a memory; switching circuitry for causing said valves to be selectively energized; control circuitry connecting said micro-controller to said switching circuitry selectively to operate said switching circuitry under the control of said micro-controller; a keyboard connected to said micro-controller for introducing selected programs into the memory of said micro-controller concerning the timing and duration of the energizing of said valves; circuit means connected to said micro-controller and including a display for displaying words and numbers to facilitate the programming of the micro-controller, to monitor the operation of the micro-controller and to exhibit malfunctions in the system; a direct current power supply connected to the micro-controller; means for connecting said direct current power supply to an alternating current source; means for connecting said micro-controller to said alternating current source to enable said micro-controller to control said switching circuitry during normal operation of said control system and to enable said micro-controller to cause said switching circuitry to de-energize all of said valves in the event of failure of said alternating current source; a back-up battery connected to the power supply for providing an energizing voltage to the micro-controller in the event of failure of the alternating current source so as to maintain the programmed data to the memory of the micro-controller to enable the system to continue to perform all of its function except actual control of said valves; and internal circuitry in said micro-controller and a resonant circuit connected to said micro-controller responding to power from said direct current voltage power supply and from said back-up battery for generating an alternating current signal of a selected frequency and providing a simulated alternating current source for the micro-controller when the system is operating on battery back-up so as to maintain clock signals in the system.

2. The control system defined in claim 1, and which includes circuit means connected to said switching circuitry and to said micro-controller and responsive to a short circuit in any of said valves to cause said micro-controller to remove the short circuited valve from the system and to cause the short circuited valve to be identified by said display.

3. The control system defined in claim 1, in which said display is of the liquid crystal type.

4. The control system defined in claim 1, in which the micro-controller responds to the actuation of a selected key of the keyboard to set the system to the current time of day.

5. The control system defined in claim 1, in which the micro-controller responds to the actuation of a selected key of the keyboard to set up any desired number of watering times per day by the system up to a predetermined maximum.

6. The control system defined in claim 1, in which the micro-controller responds to the actuation of a selected key of the keyboard to cause the current watering schedule for each of the zones to appear on said display to allow for reprogramming and reviewing the schedules for each of the zones.

7. The control system defined in claim 1, in which the micro-controller responds to the actuation of a selected key of the keyboard to interrupt the watering cycles to provide a watering pause.

8. The control system defined in claim 1, in which the micro-controller responds to the actuation of a selected key of the keyboard to interrupt the program so as to permit any number of the zones to be watered manually.

9. The control system defined in claim 1, in which said micro-controller responds to the actuation of a selected key of the keyboard to permit the user to change clock times, start times and run times for each zone during any operational phase of the system.

10. The control system defined in claim 1, in which said micro-controller includes a counter for causing the display to exhibit the remaining watering time for each zone on a minute-by-minute basis.

* * * * *